United States Patent Office 3,008,926
Patented Nov. 14, 1961

3,008,926
NON-COMBUSTIBLE, PHOSPHORUS-CONTAINING CONDENSATION RESINS AND PROCESS FOR THEIR MANUFACTURE
Martin Reuter, Kronberg (Taunus), and Erhard Wolf and Ludwig Orthner, Frankfurt am Main, Germany, assignors to Farbwerke Hoechst Aktiengesellschaft vormals Meister Lucius & Brüning, Frankfurt am Main, Germany, a corporation of Germany
No Drawing. Filed Feb. 10, 1959, Ser. No. 792,266
Claims priority, application Germany Feb. 14, 1958
3 Claims. (Cl. 260—67.6)

It is known to prepare non-combustible condensation resins by reacting, especially by heating, tetrahydroxymethylphosphonium salts or trihydroxymethylphosphine oxide with nitrogen-containing polyfunctional compounds or the N-methylol derivatives thereof. These condensation resins have been proposed for the manufacture of shaped structures from plastics, of synthetic coatings and adhesives, and for the flame-proofing of cellulose-containing clothing textiles. These resinous condensation products have the disadvantage of being dissolved to some extent when treated with boiling soda-soap solutions so that, for example, the finishing effect is gradually reduced by repeated washing and finally disappears.

Now we have found that non-combustible phosphorus-containing and nitrogen-containing condensation resins that are faster to boiling soda-soap solutions can be prepared by reacting, especially by heating, organic phosphorus-containing reaction products, obtained from 1 mol of epihalogenohydrin and 2 mols of trihydroxy-methylphosphine, with polymethylolmelamines, advantageously with the further addition of other aminoplast formers and/or the basic materials thereof.

As epihalogenohydrins there are concerned, for example, epibromohydrin and especially epichlorohydrin. About 2 mols of trihydroxymethylphosphine are added on these compounds, whereby above all diphosphonium compounds or mixtures thereof with monophosphonium compounds are formed depending on the molecular quantity of trihydroxymethylphosphine used.

The process of the present invention is carried out by mixing the phosphonium compounds as such, or if desired in molten state or in solution, with the polymethylol-melamines. The polymethylol-melamines may also be applied as such or in solution. One operates preferably in aqueous solution, but organic solvents, for example, methanol or ethanol can also be used. The mixtures are heated as such or in the form of their solutions, if necessary, after addition of such acid catalysts as are usually used in the manufacture of aminoplasts, for example, mineral salts such as magnesium chloride or ammonium nitrate, or salts of organic bases such as aminochlorohydrates, or after addition of auxiliary agents usually applied for various purposes, to a mean to higher temperature in the range of 40 and 200° C., preferably 90-170° C. The period of heating which is necessary to perform complete resinification depends on the temperature applied. It is shorter with increasing temperature and can easily be determined by small preliminary tests. In general, it is sufficient to heat to a temperature of about 100° C. for about ½ an hour, whereas at about 150° C. a period of heating of 3-5 minutes will suffice. Application of high temperatures is, however, not absolutely necessary. Resinification of the components takes place, especially when acid catalysts are used, already at room temperature, but the reaction then requires several days for completion.

It is of advantage to add to the aforementioned mixtures other aminoplast formers and/or the basic materials thereof, as, for example, dicyanodiamide, melamine, ethylene-urea, thio-urea and especially urea, and/or the methylol derivatives of these compounds.

To these resinification compositions may be added, if aqueous solutions are used, auxiliary agents such as softening agents, thickening agents or resins or resin-formers that have a different structure than the resins or resin-formers described before, in the form of aqueous solutions, emulsions or suspensions; if anhydrous compositions are used, there may also be added filling agents such as wood flour and quartz powder, or even resins or resin-formers that have a different structure than the resins or resin-formers described before, as, for example, phenoplasts, alkyd resins, and polyvinyl resins.

The process of the present invention can also be carried out by first preparing from the components, particularly in aqueous solution, water soluble precondensates of low molecular weight which are only storable at a lower or at a moderate temperature and purifying the precondensates by precipitating them with water-miscible organic solvents and then mixing them, shortly before use, with acid catalysts or, after impregnation or during processing, heating them to a higher temperature.

The proportion of the quantities of the components can vary within wide limits. One may apply, for example, for each part by weight of phosphonium compound about 0.2 to 10 parts by weight of polymethylol-melamine each. It is of advantage to apply 0.5 to 5 parts by weight of polymethylolmelamine. If other aminoplast formers or their basic substances are used simultaneously, the total amount of aminoplast formers or their basic substances and polymethylol-melamine should be within the indicated range.

As polymethylol-melamines there enter into consideration the reaction products of melamine with about 2 to 6 mols of formaldehyde.

The resinous condensation products obtained by the process of the present invention, which, depending on the composition of the product, are plastically softening at temperatures ranging from about 180–350° C., can be used instead of phosphorus-free aminoplasts for all purposes where non-combustibility is desired or required, for example, in many fields of application of the electrotechnique, as, for example, for insulators or insulating coatings, for the manufacture of shaped structures to be made of plastics as, for example, buttons or ash-trays and the like, as well as for the manufacture of adhesives.

The following examples serve to illustrate the invention but they are not intended to limit it thereto:

*Example 1*

68 grams (=0.2 mol) of an oily reaction product, obtained by reacting at 60° C. 1 mol of epichlorohydrin with 2 mols of trihydroxymethylphosphine, are dissolved in 70 grams of water and the aqueous solution obtained is mixed with a solution of 43 grams (=0.2 mol) of tri-methylol-melamine in 150 grams of water. The clear reaction solution is concentrated on the steam bath and the residue is further heated to 150° C. for ½ hour or for 15 minutes to 200° C. There are obtained 100 grams of a brittle, colorless, non-combustible resin which softens at about 250–260° C.

If half the quantity of trimethylol-melamine is replaced by 215 grams of urea (=0.3 mol) and if otherwise proceeding in the manner described above, there are obtained 100 grams of a similar resin the softening point of which is at about 230° C.

If instead of the indicated quantity of trimethylol-melamine an equivalent quantity of hexamethylolmelamine (=60 grams=0.2 mol) is used and if otherwise proceeding in the manner described above, there are obtained 110 grams of a similarly brittle resin softening at about 220° C. If half the quantity of hexamethylolmelamine is replaced by urea (=30 grams=0.5 mol), there are obtained 100 grams of a corresponding resin likewise softening at 220° C.

The resins obtained are considerably faster to boiling water and to washing with alkaline soap (soda-soap solutions) than the corresponding resins prepared according to the directions given in the periodical "American Dyestuff Reporter" 1955, on page 328, from tetrahydroxymethyl-phosphonium chloride and methylol-melamine or methylol-melamine and urea with the addition of 0.2 mol of triethanolamine.

Example 2

14 grams (=0.04 mol) of the reaction product from epichlorohydrin and trihydroxymethylphosphine described in Example 1 are stirred with 18 grams (0.08 mol) of trimethylol-melamine to form a paste, and this paste is heated to 95° C. for ½ hour. There are obtained 31.6 grams of a white brittle resin having a softening point of about 180° C.

The resins obtained are considerably faster to boiling water and to boiling soda-soap solutions than a resin obtained in similar manner by the reaction of 0.08 mol of tetrahydroxy-methyl-phosphonium hydroxide or trihydroxymethylphosphine-oxide with 0.08 mol of trimethylol-melamine, and having a softening point of about 260° to 280° C.

We claim:

1. The process for the manufacture of non-combustible phosphorus- and nitrogen-containing condensation resins wherein a reaction product, of 1 mol of an epihalogenohydrin selected from the group consisting of epichlorohydrin and epibromohydrin with 2 mols of trihydroxymethylphosphine, is reacted by heating to a temperature of 40°–200° C. with a polymethylol-melamine in a ratio of 1 part by weight of said reaction product to 0.2–10 parts by weight of polymethylol-melamine, the polymethylol-melamine being obtained by the reaction of 1 mol of melamine with 2–6 mols of formaldehyde.

2. Non-combustible phosphorus- and nitrogen-containing condensation resins obtained by the process claimed in claim 1.

3. The process for the manufacture of non-combustible phosphorus- and nitrogen-containing condensation resins wherein a reaction product, of one mol of an epihalogenohydrin selected from the group consisting of epichlorohydrin and epibromohydrin with two mols of trihydroxymethyl phosphine, is reacted by heating to a temperature of 40°–200° C. with a polymethylol-melamine and at least one nitrogenous compound selected from the group consisting of urea, thio-urea, dicyandiamide, mono- and di-methylol derivatives of these compounds, and melamine, in a ratio of one part by weight of said reaction product and at least 0.2 part by weight of polymethylol-melamine, the combined polymethylol-melamine and nitrogenous compound being present in an amount up to 10 parts by weight, said polymethylol-melamine being obtained by the reaction of one mol of melamine with 2–6 mols of formaldehyde.

References Cited in the file of this patent

UNITED STATES PATENTS

| | | |
|---|---|---|
| 2,809,941 | Reeves et al. | Oct. 15, 1957 |
| 2,810,700 | Bornstein | Oct. 22, 1957 |
| 2,830,964 | Bullock et al. | Apr. 15, 1958 |

OTHER REFERENCES

Guthrie et al.: Amer. Dyestuff Repr., vol. 44, pp. 328–332 (May 9, 1955).